(12) United States Patent
Oga

(10) Patent No.: US 6,748,407 B1
(45) Date of Patent: Jun. 8, 2004

(54) DIRECT DIGITAL SYNTHESIZER

(75) Inventor: Toshiyuki Oga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/495,912

(22) Filed: Feb. 2, 2000

(30) Foreign Application Priority Data

Feb. 3, 1999 (JP) .......................................... 11/025669

(51) Int. Cl.[7] ............................. G06F 1/02; H03L 7/06
(52) U.S. Cl. ........................ 708/271; 708/270; 327/105
(58) Field of Search ............................... 708/276, 270, 708/271; 327/107, 105; 341/118, 147

(56) References Cited

U.S. PATENT DOCUMENTS

| | | | | |
|---|---|---|---|---|
| 3,105,939 A | * | 10/1963 | Onno et al. ................. | 327/105 |
| 4,476,536 A | * | 10/1984 | Jones, Jr. .................... | 708/276 |
| 4,951,237 A | * | 8/1990 | Essenwanger ............... | 327/107 |
| 4,975,699 A | * | 12/1990 | Frey ............................ | 341/118 |
| 5,291,428 A | * | 3/1994 | Twitchell et al. ........... | 327/105 |
| 5,382,913 A | * | 1/1995 | Carson et al. ............... | 327/105 |
| 5,521,533 A | * | 5/1996 | Swanke ....................... | 327/105 |
| 5,554,987 A | * | 9/1996 | Ooga .......................... | 341/147 |
| 5,656,976 A | * | 8/1997 | Jung et al. .................. | 327/107 |
| 6,353,649 B1 | * | 3/2002 | Bockleman et al. ........ | 327/107 |

FOREIGN PATENT DOCUMENTS

JP        7-63124        7/1995

* cited by examiner

Primary Examiner—Todd Ingberg
Assistant Examiner—Chat Do
(74) Attorney, Agent, or Firm—Sughrue Mion, PLLC

(57) ABSTRACT

A direct digital synthesizer that suppresses phase jumps which would invite the generation of spurious signals. Out of phase data supplied by a phase accumulator, the value of any rounding error arising at the time of phase computation is entered into a variable delay circuit, and the phase of a signal obtained by phase-amplitude conversion is controlled to compensate for any phase jump in the output signal.

4 Claims, 3 Drawing Sheets

DIRECT DIGITAL SYNTHESIZER

BACKGROUND OF THE INVENTION

1. Field of the Invention

The present invention relates to a direct digital synthesizer for use in communication equipment, and more particularly to a direct digital synthesizer for supplying signals of a prescribed frequency in accordance with an entered reference clock and frequency data that are set.

2. Description of Related Art

A direct digital synthesizer (DDS) conventionally used in communication equipment is usually provided with a phase accumulator. This phase accumulator consists of an adder. This adder receives frequency data at one of its inputs and its own output at the other, adds them in synchronism with an external clock, and successively supplies the results of addition as the output of the phase accumulator.

The output value of this phase accumulator is entered into a phase-amplitude converter to be converted into amplitude data of DDS output signals. More specifically, many of such phase-amplitude converters convert the computation output of a phase accumulator into amplitude data of a sine waveform. Next, these amplitude data are converted by a D/A converter into analog signals to obtain DDS output signals.

In designing a DDS, first the frequency of a reference clock and the number of bits computed by the phase accumulator are determined according to the step of frequency required for the output signal.

Next, with this reference clock frequency being used as the sampling rate, the number of input bits for the D/A converter is determined according to the precision requirement of output signals, and the number of output bits for the phase-amplitude converter is determined to match the number of input bits for the D/A converter. Finally the number of bits to be entered into the phase-amplitude converter out of the computation result of the phase accumulator is determined.

Incidentally, D/A converters for use in a DDS are usually expensive. Therefore, a device with the minimum required number of input bits is selected.

On the other hand, the number of bits computable by the phase accumulator is determined by the frequency step required for output signals. For this reason, the smaller the output frequency step, the greater the number of bits required.

Accordingly, in many cases, the number of bits computable by the phase accumulator is substantially greater than the number of output bits of the phase-amplitude converter (equal to the number of input bits of the D/A converter). Therefore, the designer arranges his or her design so that only the more significant bits out of the computation result of the phase accumulator be entered into the phase-amplitude converter without entering some of the less significant bits, because entering a greater number of bits into the phase-amplitude converter, greater beyond a certain limit, than that of output bits would require an extremely large scale phase-amplitude converter, which inevitably is expensive.

On the other hand, the value represented by the less significant bits not entered into the phase-amplitude converter out of the computation result of the phase accumulator constitutes the rounding error of the input data for the phase-amplitude converter. However, as this rounding error is used every time the phase accumulator repeats its computation, a carry occurs on the more significant bits periodically.

Since input data for the phase-amplitude converter contain such carries, the sine waveform of DDS output signals suffers phase jumps at the frequency of carry occurrence, and spurious signals arise in the spectrum of DDS output signals. The occurrence of such spurious signals will be explained in more detail below. A spurious signal arises as a consequence of either one of the following two circumstances.

[1] A phase jump in an output signal resulting from periodic carries to more significant positions of the result of addition of less significant bits not entered into the phase-amplitude converter out of the output bits of the phase accumulator, and a spurious signal attributable to it:

For the sake of simplicity of explanation, the output of the phase accumulator is divided into more significant m bits and less significant n bits (m and n are natural numbers; the same applies hereinafter), m being 4 and n, also 4.

It is supposed that the more significant m bits are entered into the phase-amplitude converter, but the less significant n bits are not.

It is further supposed that both the more significant m and the less significant n bits be connected to one of the inputs of the phase accumulator, frequency set data S are entered into the other input, and the addition is repeated in accordance with a reference clock.

Further explanation will be given below with reference to specific actions.

The initial value P0 of the computation result of the phase accumulator is supposed to be:

$$P0 = 0000, 0000(B) \tag{1}$$

"(B)" in Equation (1) indicates binary notation, and "," represents the boundary between the more significant m and less significant n bits.

Now the frequency set data being represented by S1, the following being set:

$$S1 = 0100, 0000(B) \tag{2}$$

and the result of four rounds of addition by the phase accumulator being represented by P1:

$$P1 = 0000, 0000(B) \tag{3}$$

As the addition is further repeated, the phase accumulator repeats supplying the same computation result in periods of four rounds of addition each, and the DDS output signals then are stable signals, free from spurious signals.

However, if the frequency set data are represented by S2, the following is set:

$$S2 = 0100, 0001(B) \tag{4}$$

and the result of four rounds of addition by the phase accumulator is represented by P2:

$$P2 = 0000, 0100(B) \tag{5}$$

As the more significant m bits of P2 here is 0000(B), the same value as P1 of (3) is entered into the phase-amplitude converter, but the less significant n bits involve a rounding error for 0100(B).

This rounding error, if the phase accumulator further repeats addition, gives rise to a carry to the more significant m bits in the 16th round. The addition result then being represented by P3:

$$P3 = 0001, 0000(B) \tag{6}$$

will hold, the more significant m bits being different from P1. This invites a phase jump in the DDS output signals.

Since a carry from the less significant n bits to the more significant m bits occurs every 16th round of addition by the phase accumulator, the DSS output signals suffer a phase jump at the same frequency. This invites a spurious signal of a frequency corresponding to the interval of phase jumps in the spectrum of DDS output signals. The frequency fs of such spurious signals can be generally expressed in the following equation.

$$fs1 = \{\text{mod}(S/2^n)/2^n\} \cdot f_{clock} \quad (7)$$

In the foregoing equation, mod(A/B) represents the remainder of the division of A by B.

[2] A phase jump in output signals attributable to the remainder at the time of an accumulator overflow, and a spurious signal attributable to it:

A DDS output signals suffers the occurrence of a phase jump and a spurious signal, besides where the circumstance of [1] described above arises, when remainders at the time of overflowing of the phase accumulator have built up to overflow the accumulator.

For instance, where the value of the frequency set data S is set to be:

$$S3 = 0100, 0111(B) \quad (8)$$

if the addition is done four times, the accumulator will be overflowed. The value P4 of the accumulator then will be:

$$P4 = 0001, 1100(B) \quad (9)$$

This remainder will build up, and eventually this accumulated value itself will overflow the accumulator.

For instance, the next overflow will arise when the eighth addition is done, the remainder P8 then having built up in the accumulator will be:

$$P8 = 0011, 1000(B) \quad (10)$$

At the following 11th addition, the accumulator will be overflow ed. At this time, the accumulator will have a further remainder P11:

$$P11 = 0000, 1101(B) \quad (11)$$

This remainder P11 will again be accumulated by the ensuing repetition of additions, and repeat periodic overflowing. This overflowing due to the accumulation of remainders at the time of overflowing will give rise to a phase jump in the DDS output signal and to a spurious signal of a corresponding frequency component.

The frequency fs2 of this spurious signal can be generally represented by the following equation:

$$fs2 = [\text{mod}\{2^{(m+n)}/S\}/2^{(m+n)}] f_{clock} \quad (12)$$

Known techniques to suppress the above-described two kinds of spurious signals include, for instance, what is disclosed in the Japanese Published Patent No. Hei 7-63124. This example of prior art will be described with reference to FIG. 1. With reference to FIG. 1, a DDS 3 receives a clock signal S1 from a reference frequency oscillator 1 and frequency data S2 from a frequency data setting circuit 2, and enters them into a phase accumulator 31. The phase accumulator 31 supplies phase data, and more significant bits S31a are entered into a phase-amplitude converter 32A. The phase-amplitude converter 32A supplies sine wave amplitude data S32a correspondingly to the entered bits S31a. A digital-to-analog (D/A) converter 33A converts these sine wave amplitude data S32a into an analog signal in synchronism with a clock signal S1, and supplies a sine wave signal S33a.

The more significant bits S31a of the phase data are also entered into another phase-amplitude converter 32B. The phase-amplitude converter 32B supplies cosine wave amplitude data S32b orthogonal to the sine amplitude data S32a correspondingly to the entered bits S31a. A D/A converter 33B converts these cosine wave amplitude data S32a into an analog signal in synchronism with the clock signal S1, and supplies a cosine wave signal S33b.

Out of the output of the phase accumulator 31, the less significant bits S31b, without the more significant bits S31a, are supplied to a D/A converter 33C. This D/A converter 33C subjects the value of less significant bits S31b to digital-to-analog conversion, and supplies a phase error signal S34. A multiplier 34 multiplies the cosine wave signal S33b by the phase error signal S34 to supply a spurious canceling signal S35. Then the subtractor 35 subtracts the spurious signal canceling signal S35 from the sine wave signal S33a, and supplies a spurious signal-free sine wave signal S3, which the DDS 3 aims at.

However, the technique disclosed in the above-cited patent, because it involves the combination of a precision arithmetic unit to perform computation for synthesizing a waveform, entails a disadvantage of complex structure.

It also involves another disadvantage of having three D/A converters, resulting in a high cost.

Its further disadvantage is the large number of adjusting steps, necessitated by the coordination of signal levels between the multiplier and the subtractor, in addition to the analog signal output level of each D/A converter, entailing complex work and a high adjusting cost.

SUMMARY OF THE INVENTION

An object of the present invention is to provide a DDS capable of suppressing phase jumps which would invite the generation of spurious signals, be more simply structured and permit ready adjustment.

A direct digital synthesizer according to one aspect of the invention is provided with a phase accumulator for generating phase data according to a reference clock and frequency data that are entered, and a variable delay circuit for delaying an output signal resulting from phase-amplitude conversion so as to compensate for any phase jump of the output signal according to the value of any rounding error arising at the time of subjecting the phase data to the phase-amplitude conversion.

A direct digital synthesizer according to another aspect of the invention is provided with a phase accumulator for generating phase data according to a reference clock and frequency data that are entered; a phase-amplitude converter for converting more significant m bits (m is a natural number) of the phase data supplied by the phase accumulator into an amplitude value; and a variable delay circuit for delaying the output signal of the phase-amplitude converter according to a phase compensation quantity obtained from the value of less significant bits of the frequency data, without the more significant m bits, and the frequency data.

A direct digital synthesizer according to one aspect of the invention compensates for any phase jump by controlling the variable delay circuit according to the value of any rounding error arising at the time of phase computation out of the output of the phase accumulator thereby to delay the output signal.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENT

Figure 1:
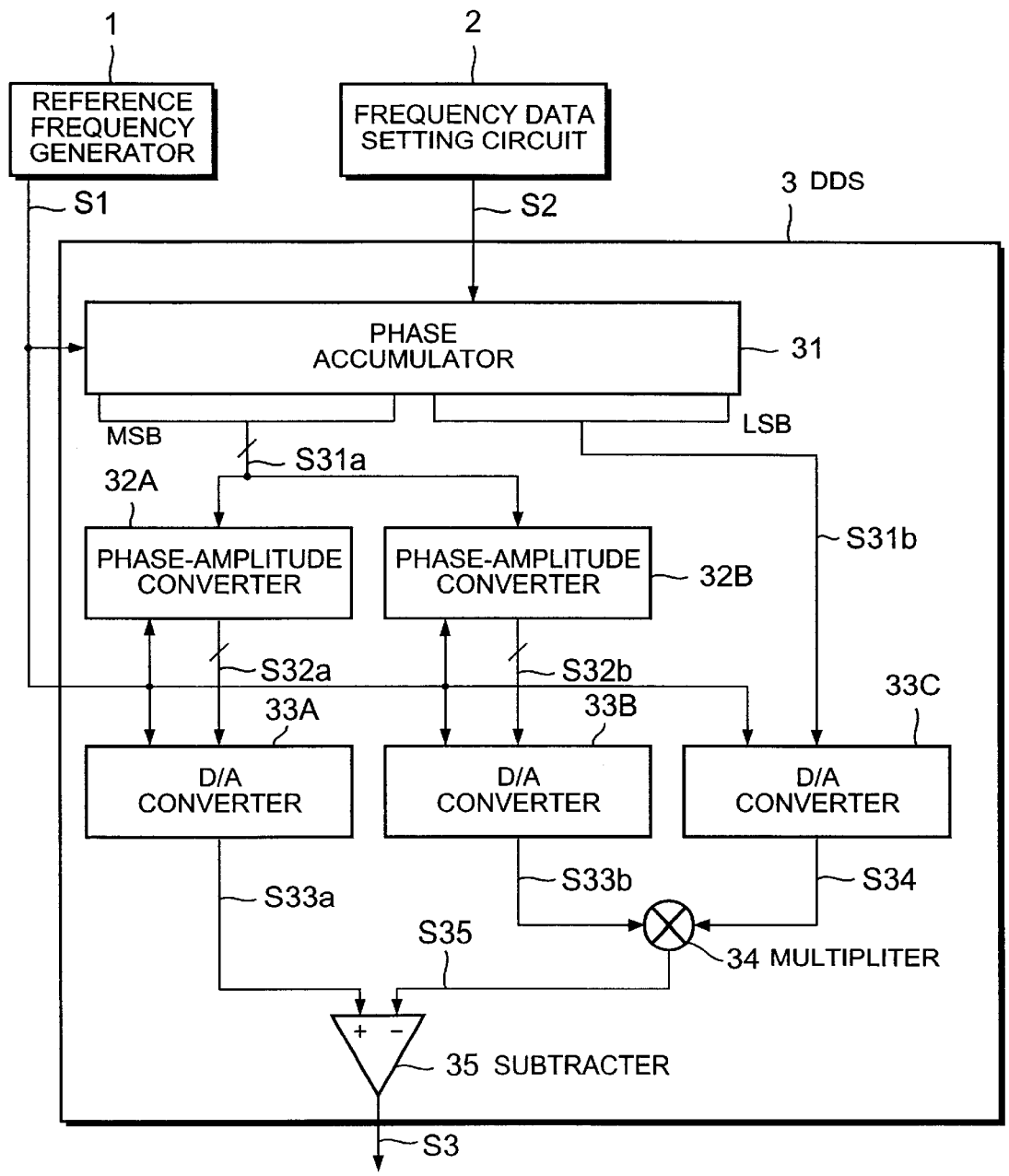
FIG. 1 is a block diagram illustrating the configuration of a direct digital synthesizer according to the prior art.

Next will be described a preferred embodiment of the present invention with reference to the accompanying drawings. In the drawings which the following description refers to, like signs denote like constituent elements.

Figure 2:
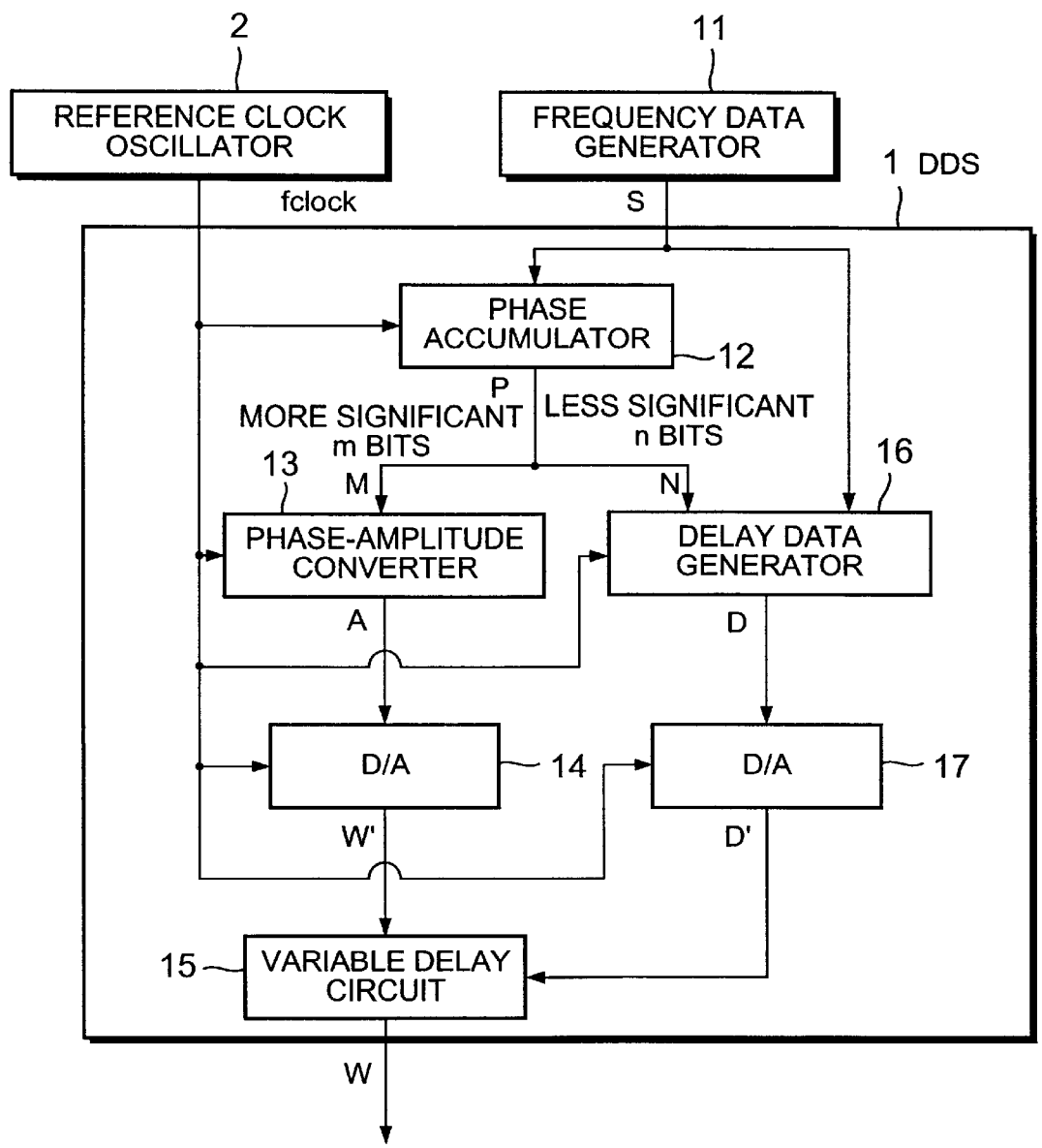
FIG. 2 is a block diagram illustrating the configuration of a direct digital synthesizer according to the invention.

FIG. 2 is a block diagram illustrating one embodiment of a DDS according to the invention. Referring to FIG. 2, the DDS 1 of this embodiment is characteristic in that its signal output section is provided with a delay circuit. This delay circuit controls the quantity of delay by a variable delay circuit according to the value N of less significant n bits which, out of the output of a phase accumulator, are not entered into a phase-amplitude converter and thereby compensates for any phase jump arising in an output signal as a consequence of a rounding error.

Referring to FIG. 2, DDS 1 has a phase accumulator 12 for generating a phase signal (P: m+n bits) by reiteratively adding frequency data (S) generated by a frequency data generator 11 in synchronism with a reference clock ($f_{clock}$) generated by a reference clock oscillator.

A phase-amplitude converter 13 is a conversion table which receives more significant m bits (M) of the phase signal (P) as its input and supplies an amplitude signal (A) of a sine wave. This conversion table can be composed of a read only memory (ROM) or the like.

A D/A converter 14 converts the amplitude signal (A) entered from the phase-amplitude converter 13 into an analog signal (W').

As the value of the less significant n bits which, out of the phase signal (P), are not entered into the phase-amplitude converter 13 represents the quantity of compensation for any phase delay of the analog signal (W'), the less significant n bits (N) are entered into a delay data generator 16 together with the frequency data (S), and converted into a compensation control signal (D), which is supplied as its output.

The compensation control signal (D) is converted into an analog signal (D'), and entered into a variable delay circuit 15.

The variable delay circuit 15 controls an equivalent to any rounding error at the time of phase-amplitude conversion by delay the analog signal (W') according to the compensation control signal (D') and thereby varying the phase of the analog signal (W'), and supplies an output signal.

Figure 3:
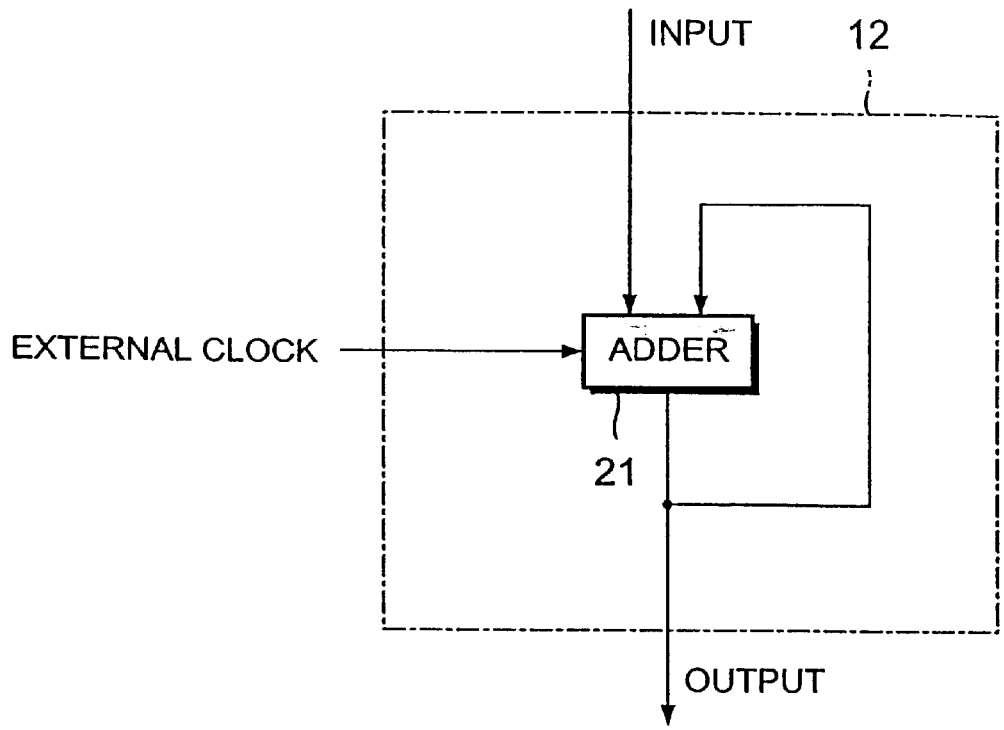
FIG. 3 is a block diagram illustrating an embodiment of the phase accumulator in FIG. 2.

FIG. 3 is a block diagram illustrating an embodiment of the phase accumulator 12 in FIG. 2. Referring to FIG. 3, the configuration of the phase accumulator 12 includes an adder 21 acting in synchronism with an external clock. The output of the adder 21 is returned to one of its own inputs and added to the data of the other input. The adder 21 disregards any overflow in its operation. If, for instance, the frequency data setpoint entered into the phase accumulator is "1", the adder 21 will reiteratively add "1" and the output will gradually increase. Eventually, the output will reach its maximum accommodable value, addition of another "1" will overflow the phase accumulator, and the output value will return to "0" followed by continued addition. As this sequence of additions from zero to the maximum value is regarded as one cycle of output signals of the DDS 1 and the output values are entered into the phase-amplitude converter as phases, this element is called the phase accumulator.

Figure 4:
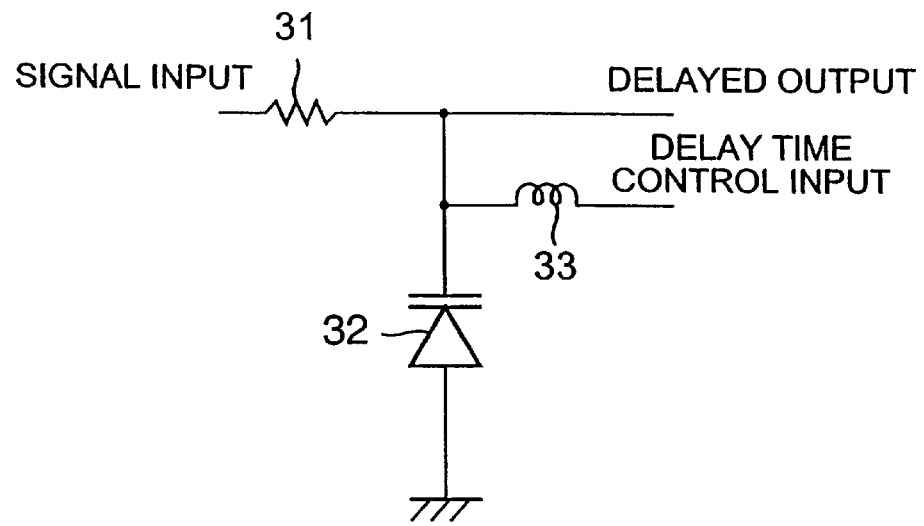
FIG. 4 is a circuit diagram of an embodiment of the variable delay circuit 15 in FIG. 2.

FIG. 4 illustrates one example of configuration of the variable delay circuit 15 in FIG. 2. Referring to FIG. 4, the variable delay circuit 15 consists of a resistor 31, a varactor diode 32, which is a variable capacity element, and an inductor 33. To one end of the resistor 31 is applied an analog input signal (W). The varactor diode 32 is grounded on its anode side, and connected to the other end of the resistor 31 on its cathode side. To the cathode side of the varactor diode 32 is applied an analog compensation control signal (D') as a bias voltage via the inductor 33. The resistor 31 and the capacitance of the varactor diode 32 constitute a delaying circuit. The capacitance of the varactor diode 32 is varied with the analog compensation control signal (D'), and the quantity of delay is thereby controlled. The inductor 33 makes the output end of the resistor 31 and that of the D/A converter 17 open high frequency-wise, and thereby acts to prevent the delayed output signal (W) from leaking to the analog compensation control signal (D') input side.

Referring back to FIG. 2, actions of different sections illustrated therein will be described. The output frequency f of the DDS 1 shown in FIG. 2 can by represented by:

$$f = f_{clock} \cdot S / 2^{m+n} \qquad (13)$$

using the reference clock frequency $f_{clock}$, the frequency data S, and the bit length m+n of the phase accumulator 12. Supposing that the output values of the phase accumulator 12 at a given point of time are M (more significant m bits) and N (less significant n bits), the phase φ to be supplied then is:

ti $\phi = \{(M \cdot 2^n + N)/2^{m+n}\} \cdot 360° + tm \qquad (14)$

However, since the phase data set to the phase-amplitude converter 13 consist only the value M of more significant m, the actually supplied phase φ' is:

$$\phi' = (M \cdot 2^n / 2^{m+n}) \cdot 360° \qquad (15)$$

Therefore, the output signal W', which is an analog sine waveform, suffers a phase delay Δφ represented by the following equation:

$$\Delta\phi = \phi - \phi' \qquad (16)$$
$$\quad = (N / 2^{m+n}) \cdot 360°$$

This can be converted into a time delay as follows by using Equation (11):

$$\Delta t = (1/f) \cdot (\Delta\phi / 360°) \qquad (17)$$
$$\quad = (2^{m+n} / f_{clock} \cdot S) \cdot N / 2^{m+n}$$
$$\quad = (1/f_{clock}) \cdot N/S$$

It is therefore seen that any rounding error occurring in phase computation can be eliminated by performing compensation control using the frequency data S and the less significant n bits N from the phase accumulator 12.

In this embodiment, the frequency data S and the value N of the less significant n bits from the phase accumulator 12 are entered into the delay data converter 16 to be converted into compensation control information D.

More specifically, the delay data converter 16 can be composed of a conversion table ROM such as described below. As the address information to be entered into the conversion table ROM, for instance, the frequency data S are assigned to a more significant position, and the less significant n bits from the phase accumulator 12, to a less significant position. For every value of the frequency data S, a compensation control value corresponding to each value of the less significant n bits N from the phase accumulator 12 is programmed. Here, it is important to program the ROM data of the delay data converter 16 also to cover compensations for nonlinear characteristics of analog circuits of the D/A converter 17 and the variable delay circuit 15 downstream mainly for the following two reasons.

[1] The relationship between the bias voltage of the varactor diode and the delay phase is not linear.

[2] Even if the delay phase is the same, the bias condition may vary with the frequency of the signal (W').

The frequency-dependence of the bias condition can be coped with by partitioning the conversion table ROM of the delay data converter 16 according to the value of the frequency data S. Further by programming data compensated for nonlinear characteristics of the bias voltage of the varactor diode at each frequency, complex characteristics can be compensated for with a simple configuration.

To add, the data to be delivered from the phase accumulator 12 to the delay data converter 16 may as well consist of some of more significant bits of the less significant n bits N, which are not supplied to the phase-amplitude converter 13, because this disposition makes it possible to control the capacitance value of the variable delay circuit 15 at a level of accuracy corresponding to the number of bits used and thereby to accomplish phase compensation.

As hitherto described, any phase jump in the sine waveform as a consequence of a rounding error by the phase-amplitude converter of the DDS is compensated for. Spurious signals can be thereby suppressed.

While this invention has been described with reference to certain preferred embodiments, it is to be understood that the subject matter encompassed by this invention is not to be limited to these specific embodiments.

On the contrary, it is intended for the subject matter of the invention to include all such alternatives, modifications and equivalents as can be included within the spirit and scope of the following claims.

What is claimed is:

1. A direct digital synthesizer comprising:
    a phase accumulator for cumulatively computing phase data according to a reference clock and frequency data that are entered;
    a phase-amplitude converter for converting most significant m bits of the phase data supplied by said phase accumulator into an amplitude value; and
    a variable delay circuit operable to delay the output signal of said phase-amplitude converter according to a phase compensation quantity obtained from the value of least significant bits of said phase data, without said most significant m bits, and said frequency data;
    wherein said phase accumulator is provided with an adder, which receives said frequency data at one of its inputs and its own output at the other input, for adding them in synchronism with said reference clock;
    wherein said variable delay circuit delays the output signal of said phase-amplitude converter according to the product of multiplication of the reciprocal of the frequency of said reference clock by the quotient of the division of the least significant bits of said phase data, without the most significant m bits, by said frequency data;
    wherein a digital-to-analog converter is arranged on the signal input side of said variable delay circuit; and
    wherein said time constant circuit comprises:
        a resistor whose input is the output signal of a digital-to-analog converter for analog conversion of the output of said phase-amplitude converter, and a variable capacity element which is connected between the output of this resistor and the ground and whose capacitance varies according to said analog compensation control signal.

2. A direct digital synthesizer, as claimed in claim 1, wherein:
    said time constant circuit comprises:
        a high frequency component eliminating element serving to prevent the signal resulting from the analog conversion of the output of said phase-amplitude converter from leaking to the input signal line side for said analog compensation control signal.

3. A direct digital synthesizer comprising:
    a phase accumulator operable to generate a phase data by reiteratively adding frequency data, wherein the phase data comprises most significant bits and least significant bits of phase data; and
    a delay data generator operable to generate a compensation control signal using the least significant bits of the phase data and the frequency data.

4. A direct digital synthesizer as claimed in claim 3, further comprising:
    a phase amplitude converter operable to convert the most significant bits of phase data to an amplitude signal; and
    a variable delay means for compensating for any rounding error generated at a time when the amplitude signal is generated.

* * * * *